No. 756,536. PATENTED APR. 5, 1904.
A. F. SHERWOOD.
SAFETY TIRE.
APPLICATION FILED MAR. 23, 1903.
NO MODEL.
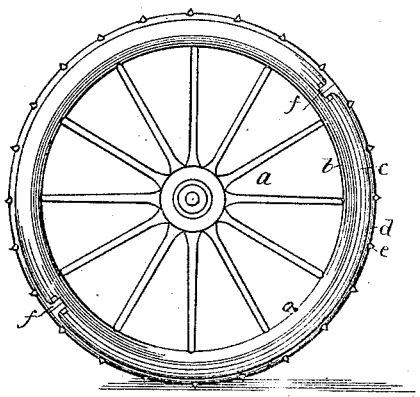
Fig. I
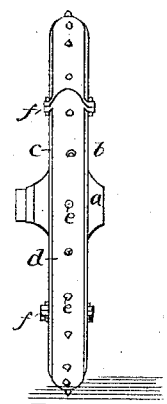
Fig. II
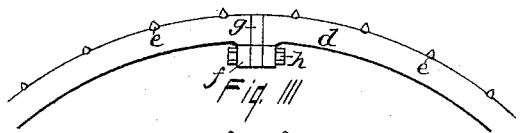
Fig. III
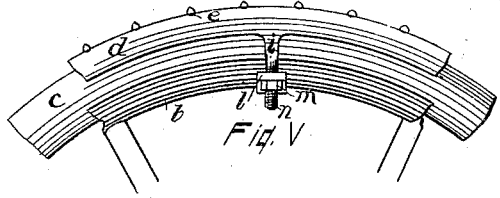
Fig. V
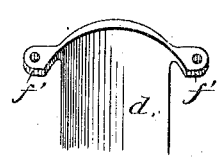
Fig. IV
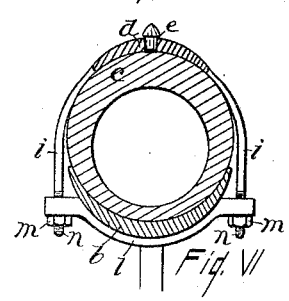
Fig. VI
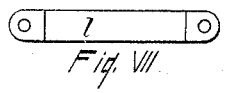
Fig. VIII
Witnesses
John Moozey.
George Sherwood.
Inventor
Absalom F. Sherwood
By Attorney
H. Audison No. 756,536. Patented April 5, 1904.

UNITED STATES PATENT OFFICE.

ABSALOM F. SHERWOOD, OF PEEKSKILL, NEW YORK.

SAFETY-TIRE.

SPECIFICATION forming part of Letters Patent No. 756,536, dated April 5, 1904.

Application filed March 23, 1903. Serial No. 149,221. (No model.)

*To all whom it may concern:*

Be it known that I, ABSALOM F. SHERWOOD, a citizen of the United States, and a resident of Peekskill, in the county of Westchester and State of New York, have invented a certain new and useful Safety-Tire, of which the following is a specification.

This invention relates to elastic-tired wheels, and has for its object means to prevent their slipping over icy or like smooth surfaces. The object is attained by the means set forth in these specifications and the accompanying drawings, in which—

Figure I represents in elevation an automobile-wheel with the invention attached. Fig. II is an elevation of the face of the wheel. Fig. III is a section of the antislipping-tire. Fig. IV is a view of a connecting end of the antislipping-tire. Fig. V represents a section of an automobile-wheel, showing features of the invention on an enlarged scale. Fig. VI is a cross-section through a wheel and the attached device. Fig. VII is a plan of a clamping-plate.

The invention consists, as will be seen by reference to Fig. I, of a metallic tire $d$, made in parts and provided with calks $e$ upon its surface, the tire to be clamped over the periphery of the rubber tire of a wheel $a$ in a manner shown at $f f$. The inner surface of the tire $d$ is adapted to fit the rubber tire $c$ and is preferably thicker in its middle part than at the edges, as in Figs. IV and VI.

The tire $d$ is shown as made in two parts, but may be divided into more if necessary, the ends of the parts being provided with perforated lugs $f' f'$, Fig. IV. The ends are shown united in Figs. I and III at $f$ by bolts $h$. In the latter figure an elastic washer $g$ is shown. The washer conforms in shape to the ends of the tire-sections, its design being to fill any space between the ends that might be occasioned by a difference in diameters between the metallic and the rubber tires. The metallic tire may be in one piece without joints for use on pneumatic tires that may be sufficiently deflated to admit of their being forced over the elastic tire. When so used, inflating the pneumatic tire will securely hold the metallic tire in place. As an additional means of securing the tire $d$, it is provided with side lugs $i$, Figs. V and VI. The ends of the lugs $i$ are threaded and pass through a clamping-plate $l$, Figs. V, VI, and VII, and by means of the nuts $m$ any displacement of the tire $d$ is rendered impossible.

The calks $e$ are to be adapted in size to the size of wheel and the weight of vehicle. They may be inserted in the tire by the usual means of setting calks in horseshoes, so that in case of breakage they may be replaced, or they may be riveted to the tire. In Fig. VI the calk is shown as driven into a tapering socket. More than one row of calks may be used, and a number of small ones may be employed instead of a less number of larger ones. They might be made integral with the tire; but in that case they could not be readily hard-tempered and would soon wear down and present smooth surfaces that would fail of their object.

Having described my invention, what I claim, and desire to secure by Letters Patent, is—

1. The combination in a supplementary tire for soft tires, of a metallic tire in two or more sections, lugs at the ends of the sections for securing the sections together, lugs projected downward from the sides of the sections for attachment to clamps under the fellies, the sections crescent-shaped in cross-section, removable calks in the thick part of the sections, and soft-rubber washers between the joints of the sections.

2. The combination in a supplementary tire for soft tires, of a metallic tire in two or more sections, lugs at the ends of the sections for securing the sections together, lugs projected downward from the sides of the sections for attachment to clamps under the fellies, the sections crescent-shaped in cross-section, and removable calks in the thick part of the sections.

Signed at Peekskill, in the county of Westchester and State of New York, this 14th day of March, A. D. 1903.

ABSALOM F. SHERWOOD.

Witnesses:
 EDWD. C. WILSON,
 HUGH C. WILSON.